US009614572B2

(12) United States Patent
Ley et al.

(10) Patent No.: US 9,614,572 B2
(45) Date of Patent: Apr. 4, 2017

(54) APPARATUS AND METHOD FOR EXTENDING FEATURE SELECTION IN A COMMUNICATION SYSTEM

(71) Applicant: MOTOROLA SOLUTIONS, INC, Schaumburg, IL (US)

(72) Inventors: David J. Ley, Plantation, FL (US); Mark A. Antilla, Davie, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/622,077

(22) Filed: Feb. 13, 2015

(65) Prior Publication Data

US 2016/0241298 A1    Aug. 18, 2016

(51) Int. Cl.
*H04B 1/40*       (2015.01)
*H04B 1/405*      (2015.01)
*H04B 1/3827*     (2015.01)
*H01H 19/14*      (2006.01)

(52) U.S. Cl.
CPC ............. *H04B 1/405* (2013.01); *H01H 19/14* (2013.01); *H04B 1/3833* (2013.01); *H01H 2221/01* (2013.01)

(58) Field of Classification Search
CPC ............. G08B 21/0269; G08B 27/001; G08B 13/19658; G08B 25/008; G08B 25/016; G08B 25/08; H04M 1/6058; H04M 1/72536; H04M 1/72572; H04M 2250/10; H04M 3/51; H04M 1/6066; H04M 1/72502; H04M 3/533; H04M 3/382; H04M 3/42; H04M 3/428; H04Q 2213/13098; H04Q 2213/13093; H04Q 2213/13103; H04Q 2213/13106; H04Q 2213/13299; H04Q 2213/13405; H04Q 11/0457

See application file for complete search history.

(56) References Cited

U.S. PATENT DOCUMENTS

| 4,110,690 A | 8/1978 | Kakigi |
| 4,147,904 A | 4/1979 | Carpenter et al. |
| 4,178,547 A | 12/1979 | Santana |
| 5,784,688 A * | 7/1998 | Siddoway ............ H05K 5/0017 455/90.3 |
| 7,154,480 B2 | 12/2006 | Iesaka |

(Continued)

FOREIGN PATENT DOCUMENTS

| EP | 2528358 A1 | 11/2012 |
| GB | 1584623 A1 | 2/1981 |

OTHER PUBLICATIONS

The International Search and the Written Opinion, SN: PCT/US2016/017435, Filed: Feb. 11, 2016, mailed: May 23, 2016, all pages.

*Primary Examiner* — Golam Sorowar
(74) *Attorney, Agent, or Firm* — Barbara R. Doutre

(57) ABSTRACT

A method and apparatus for expanding control switch selectivity in a portable communication system is provided. A rotary control switch is remapped based on the presence of two or more switches in the system thereby increasing the number of user selectable switch features, such as user selectable radio channels. The remapping can occur automatically without the need for hardware changes. The improved user interface can extend channel range selection in a portable communication system having a portable radio and radio accessory.

10 Claims, 5 Drawing Sheets

(56) References Cited

U.S. PATENT DOCUMENTS

2005/0075133 A1* 4/2005 Pinder ............... H04M 1/72527
　　　　　　　　　　　　　　　　　　　　　　455/557
2013/0014167 A1　　1/2013　Sakashita et al.

* cited by examiner

APPARATUS AND METHOD FOR EXTENDING FEATURE SELECTION IN A COMMUNICATION SYSTEM

FIELD OF THE DISCLOSURE

The present disclosure relates generally to portable communication devices, and more particularly to extending feature selection capability in portable radios being used in conjunction with electronic accessory devices.

BACKGROUND

A portable communication device, such as a portable radio operating in a two-way radio communications environment, typically utilizes a channel selector switch with hard stops to provide direct access to a plurality of radio channels. A typical channel selector switch (CSS) provides access to 16 channels as part of the radio's user interface. Some portable radio users have indicated a desire to access more channels. While a channel selector switch with hard stops is considered desirable, attempting to provide additional hardstops to such a switch reduces tactile feedback. Other approaches, for example continuous rotary switches, are not well received in certain markets, and approaches using channel up/down buttons are more difficult to access and require multiple button presses or holding down of a button for a long time. Tactile feedback is very important for radios being operated in public safety environments, where loud noise, poor visibility, and gloved usage are often encountered. A simpler approach to extending radio features, particularly channel selection, is thus highly desirable. Additionally, space constraints must be addressed when attempting to add user interface features to any portable electronic product.

Accordingly, there is a need an improved approach for providing an extended range of radio features.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Figure 1:
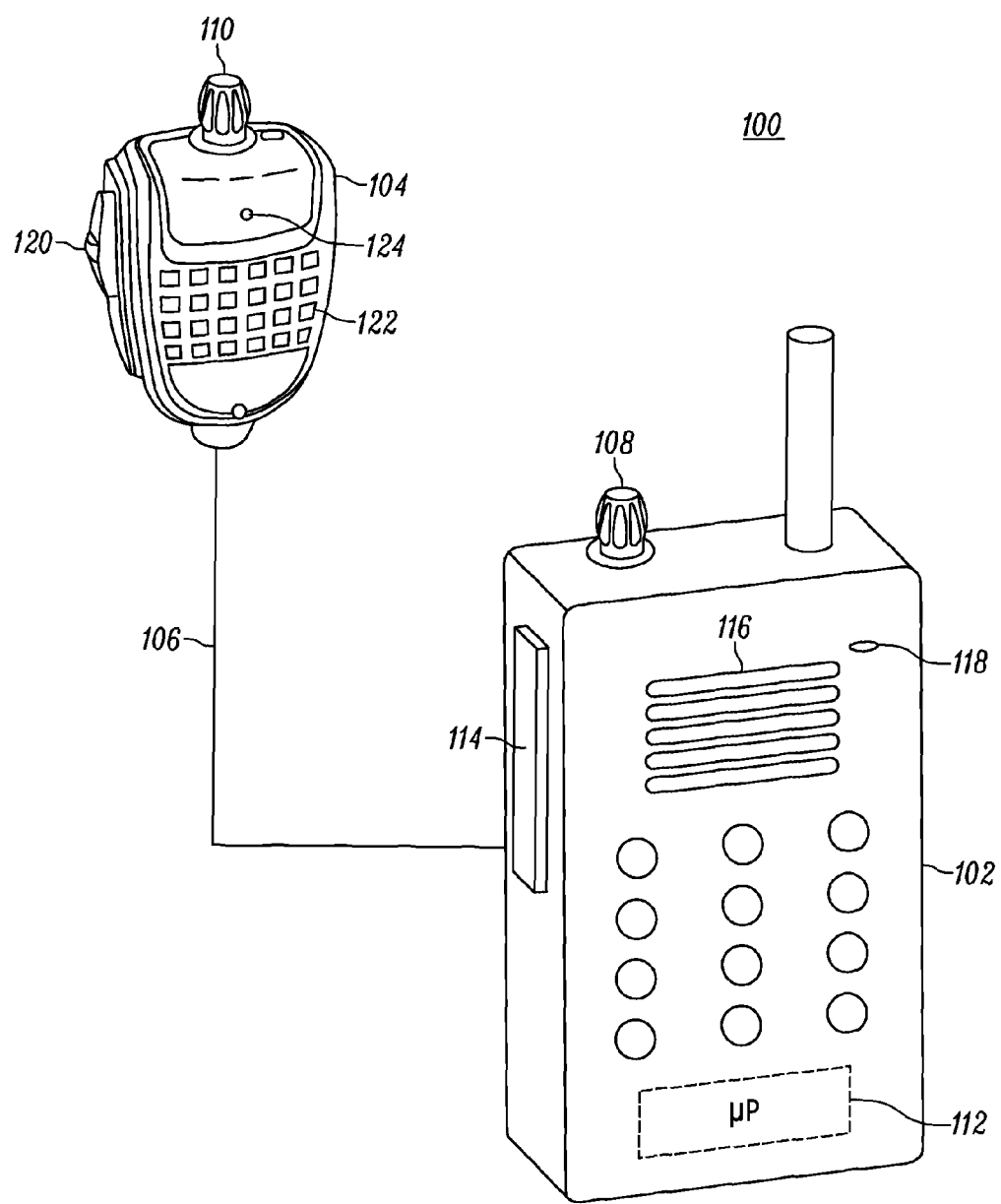
FIG. 1 is a communication system in accordance with the various embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Well known elements, structure, or processes that would be necessary to practice the invention, and that would be well known to those of skill in the art, are not necessarily shown and should be assumed to be present unless otherwise indicated.

DETAILED DESCRIPTION

Briefly, there is provided herein a method and apparatus for remapping a user input switch based on the presence of two or more switches in a portable communication system. In accordance with the various embodiments, a secondary switch is remapped to become an extension of a primary switch (or alternatively the primary switch becomes an extension of the secondary switch). In one of the embodiments, the function of one switch is automatically remapped to become a complimentary feature of another switch. In another embodiment, the function of one switch is automatically remapped to become an extension of the other switch. The automatic remapping can occur automatically without the need for any user interaction or hardware changes. The various embodiments, as applied to channel control switches, provide an improved user interface having an extended channel range using a channel control switch of a portable radio and a channel control switch of a radio accessory in conjunction with various remapping techniques.

FIG. 1 is a communication system 100 operating in accordance with various embodiments. Communication system 100 comprises first and second portable communication devices 102, 104 operatively coupled, either via wired or wireless coupling 106, operating within a larger communications system or network. The primary portable communication device 102 may comprise a two-way radio or other portable communication device having a rotary control switch 108 controlling a radio function. The secondary communication device may comprise an electronic radio accessory, such as a remote speaker microphone, also having a rotary control switch, referred to as RSM rotary control switch 110. Portable radio 102 comprises known radio elements, such as a controller having a microprocessor 112, transmitter and receiver (not shown). Radio 102 further comprises user interface features including a push-to-talk (PTT) button 114, speaker 116 and microphone 118. The electronic radio accessory 104 may have similar (or fewer) elements depending on the accessory's purpose but generally provides remote access to the radio interface features. For purposes of description, the primary communication device will also be referred to as portable radio 102, and secondary communication device 104 will also be referred to a remote speaker microphone (RSM) 104. The RSM 104 comprises a PTT button 120, a speaker 122, and a microphone 124. The RSM 104 is typically worn at the user's shoulder while the portable radio is coupled elsewhere on the user's body, for example clipped to the user's belt.

Each communication device 102, 104 comprises its own respective rotary control switch 108, 110. For the portable radio 102 and the RSM 104 each rotary control switch 108, 110 operates as a channel control switch. However, rather than simply duplicating the identical channels as done in past systems, communication system 100 operates in accordance with the various embodiments in which one of the rotary switches (108 or 110) is used to extend the selection of the other rotary switch (108 or 110). While the embodiments are described in terms of channel control switches, the embodiments of the disclosure may also be applied to other electronic functions controlled via hardstop rotary control switches of portable communication devices.

In accordance with the various embodiment, communication system 100 is configured via controller 112 to remap a switch function (e.g. the RSM rotary control channel switch) based on the presence of another switch (e.g. radio rotary control channel switch). The remapping advantageously occurs without any hardware changes. In some embodiments, the remapping occurs automatically without any user interaction.

In past systems, both switches selected the same channels 1-16. However, communication system 100, operating in accordance with one of the embodiments, remaps with RSM channel selector switch 110 to access a different set of channels 17-32 when the RSM 104 is operatively coupled to the radio, thereby extending the channel range selection to a total of 32 channels.

In another embodiment, the communication system 100 remaps one of the rotary control switches to be a complimentary function of the other switch. For the purposes of this application a complimentary function is a feature that is closely aligned, or otherwise, generally associated with the first feature. For example, the complimentary feature of zone (or folder) selection can be used to extend the channel selection. "Zones" are groupings of channels. A user will select which zone (group) of channels with one rotary switch, say at the radio rotary control switch 108, and then select the specific channel in that group from the RSM rotary control switch 110. When applied to this type of operation, the radio's 16 position channel selector switch 108 can automatically be remapped to select which zone the user wants when the RSM 104 is attached to the radio 102. Each zone (of 16 zones) will allow a selection of 16 channels per zone (at the RSM). Therefore, the user can select zones 1-16 on the radio selector switch and channels 1-16, 17-32, 33-48, etc. (in whichever zone is selected) through the RSM rotary control switch 110. This embodiment provides access to 256 channels (16 zones×16 channels per zone).

The methods described herein can be performed using a controller(s) in the radio 102 and/or the radio accessory 104. Thus, additional hardware is not necessary. Both communication devices 102, 104 have rotary control switches 108, 110, and preferably rotary control switches for the use of channel selection (i.e. a rotary channel control switch).

Figure 2:
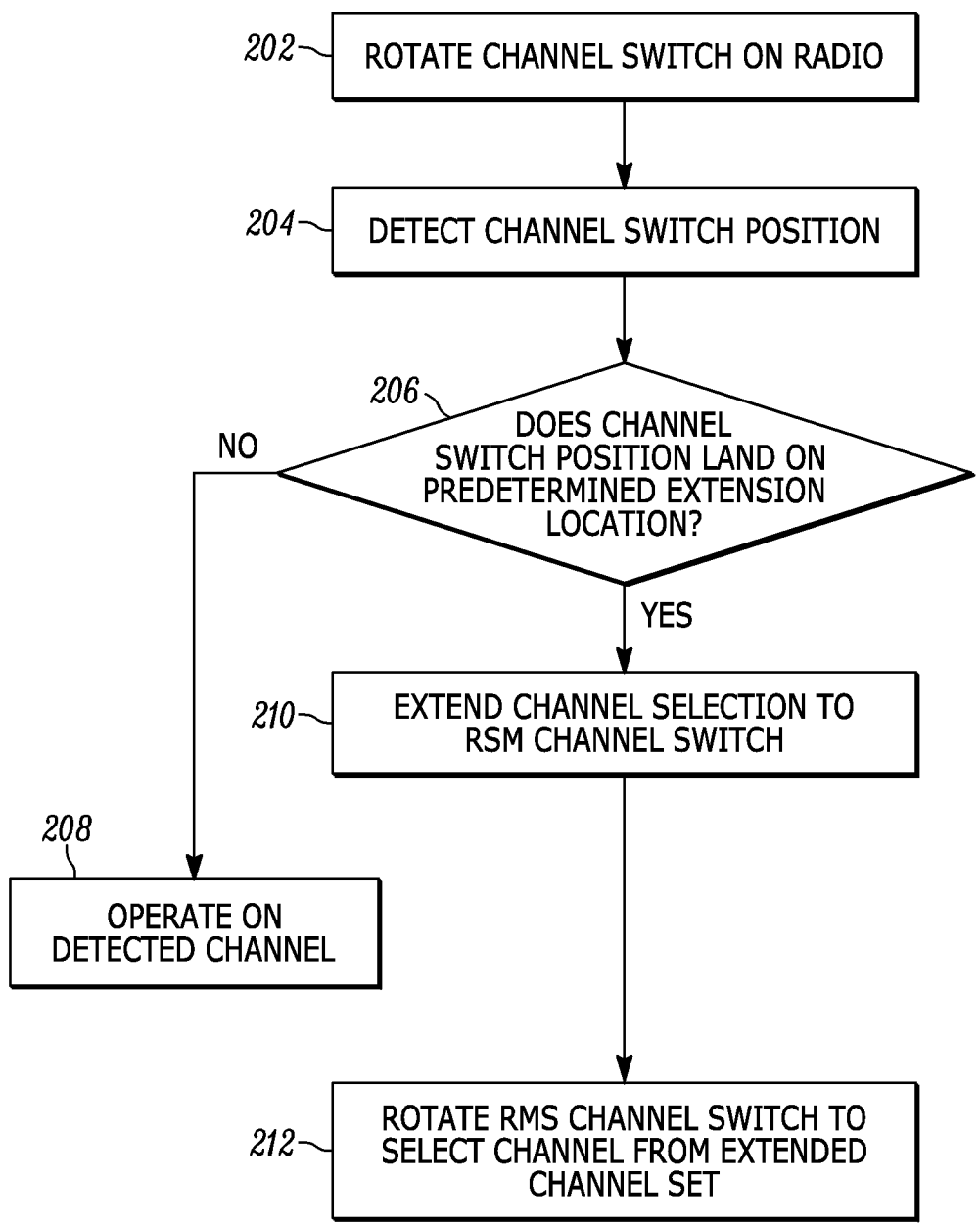
FIG. 2 is a method for extending channel selection in accordance with some embodiments.

FIG. 2 is a method 200 for extending channel selection in accordance with some embodiments. At 202, a channel switch of the radio is rotated and the channel switch position is detected at 204. At 206, the radio determines whether the channel switch position lands on a predetermined extension location. If the channel switch location does not land on the predetermined extension location at 206, then the channel operation operates on the detected channel.

In accordance with some of the embodiments, if the channel switch location does land on the predetermined extension location at 206, then the method 200 proceeds to extend channel selection to the switch of the remote speaker microphone (RSM) at 210, such as switch 110 of RSM 104 of FIG. 1. The RMS control switch is then rotated at 212 to select a channel from the extended channel set.

As an example, the radio 102 may provide positions 1-16 of operation via 16 hardstops, with positions 1-15 being used for channels, and position 16 being used as the enabler for channel extension. If the radio switch is rotated to hardstop 16, then channel control is remapped to the RSM control switch to provide an extension of channel selection, for example channels 17-32.

Alternatively, method 200 can be enabled automatically upon operatively coupling the radio accessory 104 to the portable radio 102, without the need to dedicate a hardstop of the radio switch to the channel extension mode. This allows for channels 1-16 to be selected using the first control switch and channels 17-34 to be selected from the second control switch.

Figure 3:
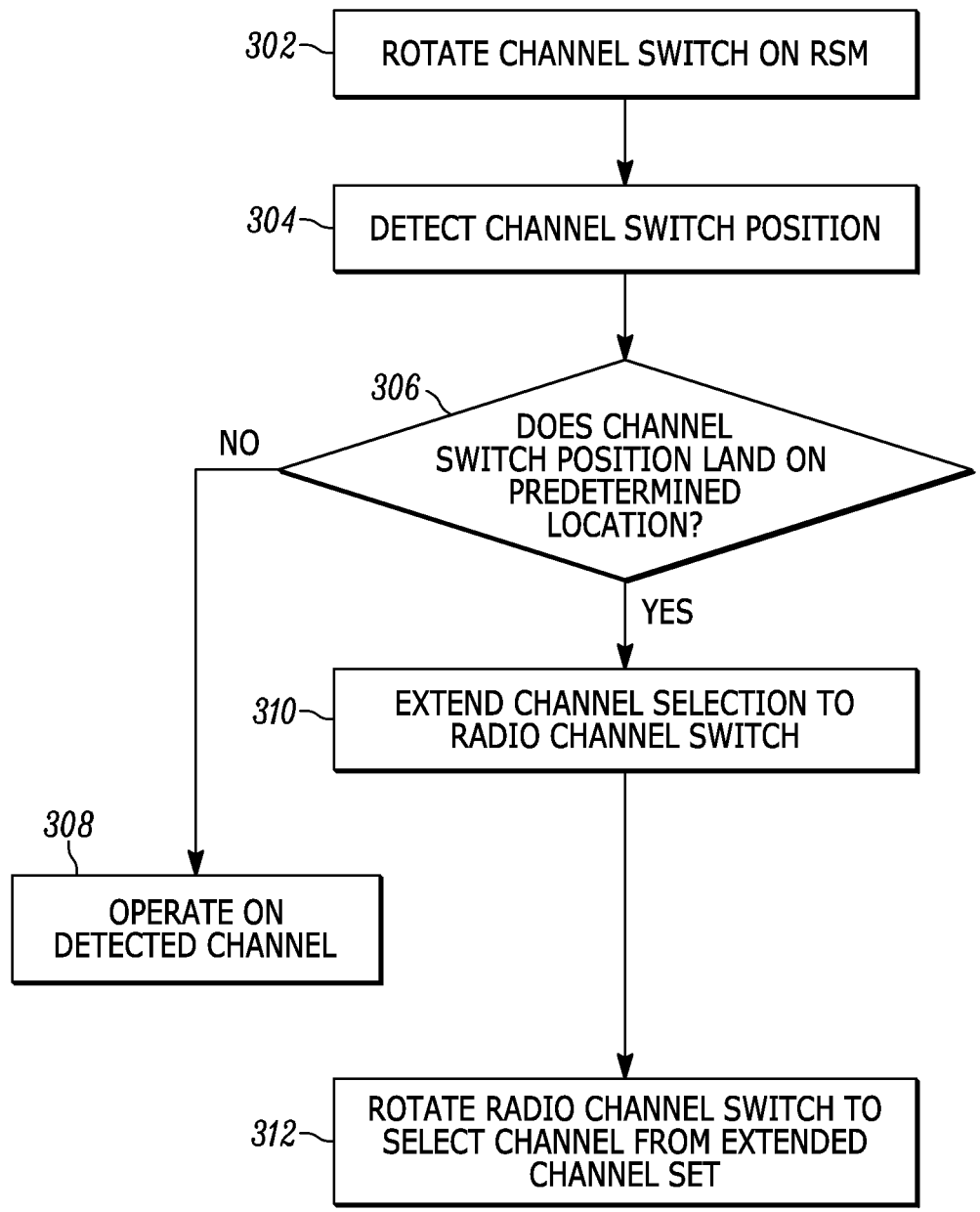
FIG. 3 is another method for extending channel selection in accordance with some embodiments.

FIG. 3 is a method 300 of extending channel selection in accordance with some embodiments. Method 300 reverses method 200 by remapping the secondary device. At 302, a channel switch of the accessory device, such as RSM 104, is rotated and the channel switch position is detected at 304. At 306, the RSM determines whether the channel switch position lands on a predetermined extension location. If the channel switch location does not land on the predetermined extension location at 306, then the channel operation operates on the detected channel.

If the RSM channel switch location does land on the predetermined extension location at 306, then the method 300 proceeds to extend channel selection to the radio control switch at 310, such as radio rotary control switch 108 of radio 102 of FIG. 1. The radio rotary control switch 108 can then be rotated at 312 to select a channel from the extended channel set.

As an example, the RSM 104 may provide channels 1-16 of operation via 16 hardstops, with position 16 being used as the enabler for channel extension. If the RSM switch is rotated to hardstop 16, then channel control is remapped to the radio 102 to provide an extension of channel selection. For example radio channels 17-32. The radio channel switch 108 can then be rotated to select any channels from 17-32.

Alternatively, method 300 can be enabled automatically upon operatively coupling the radio accessory 104 to the portable radio 102, without the need to dedicate a hardstop of the RSM switch to the channel extension mode. This allows for channels 1-16 to be selected using the RSM control switch and channels 17-32 to be selected from the radio control switch.

Figure 4:
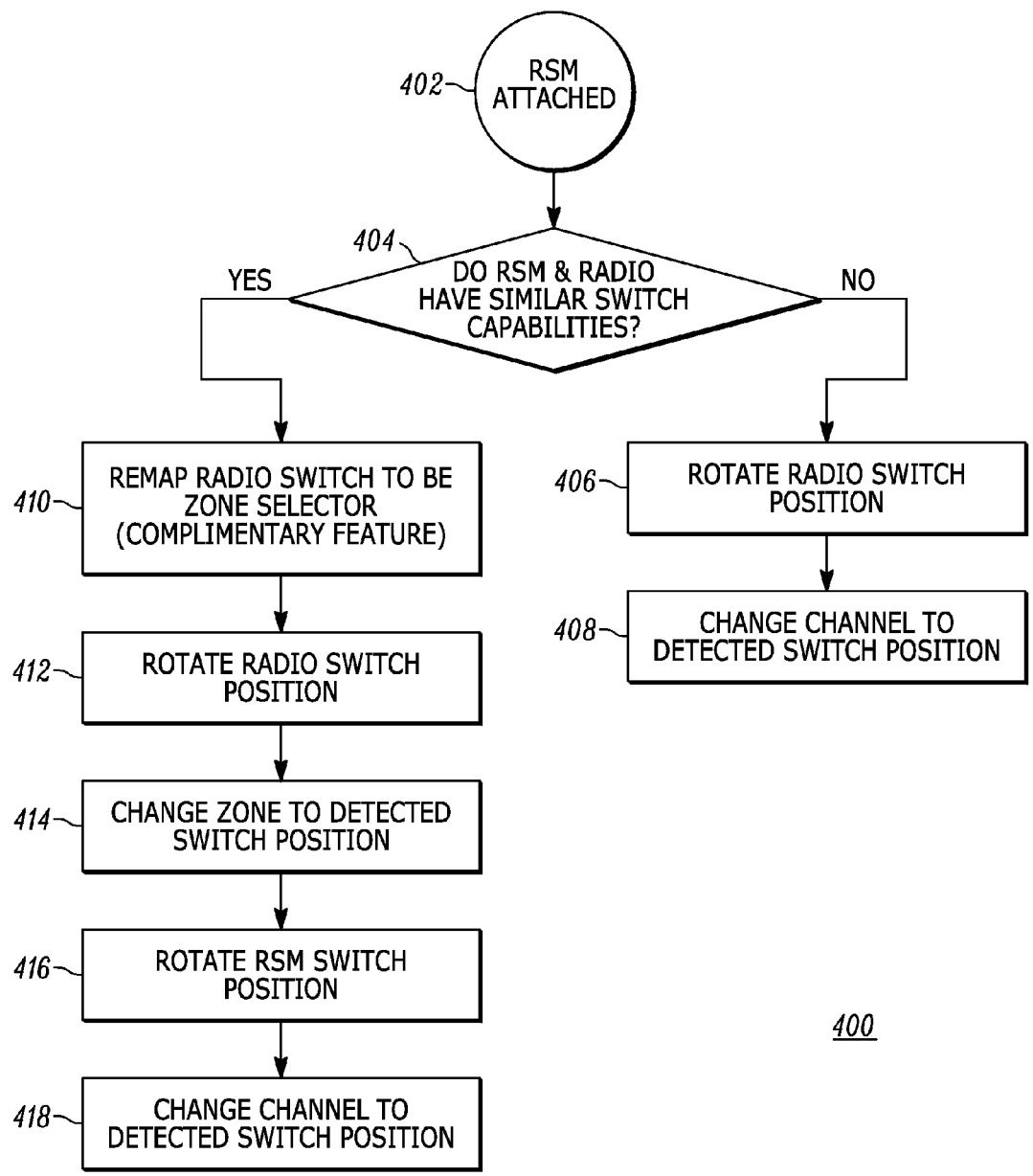
FIG. 4 is another method for extending channel selection in accordance with some embodiments.

FIG. 4 is a method 400 of extending channel selection in accordance with some embodiments. Method 400 shows complimentary feature remapping occurring automatically upon detection of a radio accessory (e.g. RSM 104) having similar switch capability. Method 400 begins by detecting coupling, either wired or wireless coupling, of the RSM to the radio at 402. At 404, a determination is made as to whether the RSM and radio have similar switch capabilities. If the RSM and radio do not have similar switch capabilities, then regular radio switch operation takes place by rotating the radio switch position at 406 to change the radio channel to the detected position at 408.

If the RSM and radio do have similar switch capabilities, then remapping occurs at 410 by remapping the radio switch to be a zone (or folder) selector, which is a complimentary feature of channel selection. By rotating the radio switch position at 412, zone changes are detected at 414. Once a zone is detected by the radio switch position, then the RSM switch can be rotated at 416 to change channels within that detected zone at 418.

Hence, the embodiment of switch expansion provided by method 400 uses one of the two knobs as a zone (or folder) selector and the other knob as a channel selector with each zone having access to a different set of channels.

For example, radio rotary control switch 108 (Knob 1) being located at position 1 enables the RSM rotary control switch 110 (Knob 2) to select channels 1-16; radio rotary control switch 108 being located at position 2 enables the RSM rotary control switch 110 to select channels 17-32, and so on. Accordingly, for rotary control switches having 16 switch positions, the method 400 can advantageously provide access to 16×16=256 channels via the two knobs 108, 110. No hardware modifications are required for this expanded switch selectivity.

The following Table illustrates the example discussed in relation to method 400:

TABLE 1

|  | Knob 1 (radio) Zone/Folder selection | Knob 2 (RSM) Channel selection |
| --- | --- | --- |
| Coupling and Similar switch Capabilities | 1 2 3 ⋮ | 1-16 17-32 33-48 ⋮ |
| Coupling and Non-Similar Switch Capabilities | 1-16 | 1-16 |

Figure 5:
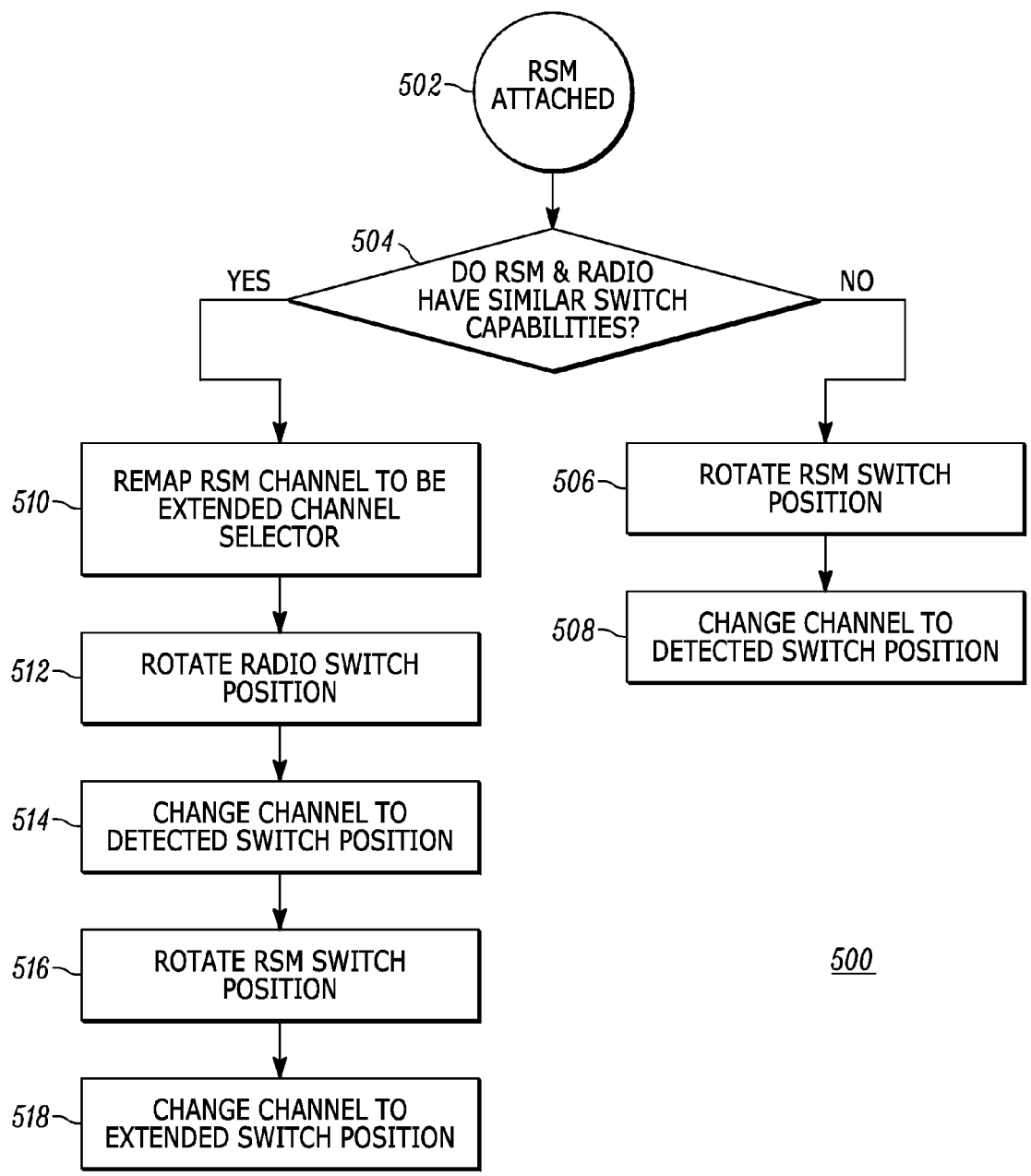
FIG. 5 another method for extending channel selection in accordance with some embodiments.

FIG. 5 is a method 500 of extending channel selection in accordance with some embodiments. Method 500 provides automatic channel extension remapping upon detection of a radio accessory (e.g. RSM) with similar switch capability.

Method 500 begins by detecting coupling, either wired or wireless coupling, of the RSM (e.g. RSM 104) to the radio (e.g. radio 102) at 502. At 504, a determination is made as to whether the RSM and radio have similar switch capabilities. If the RSM and radio do not have similar switch capabilities, then regular RSM switch operation takes place by rotating the RSM switch position at 506 to change the channel to the detected RSM switch position at 508. If the RSM and radio do have similar switch capabilities at 504, then remapping occurs at 510 by remapping the RSM channel switch to be an extended channel selector for the radio. The radio switch thus provides a first set of predetermined channels, and the RSM switch provides a second set of predetermined channels. Rotation of the radio switch at 512 allows for the channel to be changed at 514 to a detected radio switch position. Rotating the RSM switch position at 516 allows for the channel to be changed through the extended switch position at 518. Accordingly, the channel can be changed using the predetermined channels of the radio switch or the extended channel selection provided by the RSM switch.

Hence, the embodiment of switch expansion provided by method 500 uses both knobs as channel selectors, the first knob providing a first set of channels and the second knob being remapped to provide a second set of channels which are extended channels. Accordingly, for radio knobs having 16 switch positions, the method 500 can advantageously provide access to 32 channels via the two knobs. No hardware modifications are required for this expanded switch selectivity.

The following Table illustrates the example discussed in relation to method 500:

TABLE 2

|  | Knob 1 (radio) Channel selection | Knob 2 (RSM) Channel selection |
| --- | --- | --- |
| Coupling and Similar switch capabilities | 1-16 | 17-32 |
| Coupling and non-Similar switch capabilities | 1-16 | 1-16 |

Accordingly, embodiments of the disclosure provide the benefit of extending switch selectivity to an existing portable radio being used in conjunction with a radio accessory, such as a speaker microphone accessory, with no hardware changes required on either device. The embodiments have provided for a simpler approach to extending radio features, particularly channel selection. The expanded channel selection can occur automatically by coupling the devices and rotation of the switch in a single action. The disclosed methods expand existing channel capability without requiring shifting or holding buttons for an extended period of time. Tactile feedback and space constraints have been maintained by remapping existing hardstop rotary switches of the devices, making the radio and accessory devices highly beneficial to public safety environments, where products are often operated under severe conditions including loud noise, poor visibility, and gloved usage.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

We claim:

1. A communication system, comprising:
a first portable communication device having a first rotary control switch; and
a second portable communication device having a second rotary control switch, the second portable communication device being operatively coupled to the first portable communication device, and the second rotary control switch extending selectivity of the first rotary control switch, wherein the first rotary control switch has a hardstop dedicated to remapping the second rotary control switch to an expanded switch selection of the first rotary control switch.

2. A communication system, comprising:
a first portable communication device having a first rotary control switch; and
a second portable communication device having a second rotary control switch, the second portable communication device being operatively coupled to the first portable communication device, and the second rotary control switch extending selectivity of the first rotary control switch, wherein the second rotary control switch has a hardstop dedicated to remapping the first rotary control switch to an expanded switch selection of the second rotary control switch.

3. A communication system, comprising:
a first portable communication device having a first rotary control switch; and
a second portable communication device having a second rotary control switch, the second portable communication device being operatively coupled to the first portable communication device, and the second rotary control switch extending selectivity of the first rotary control switch;
wherein the extended switch selectivity is automatically enabled upon operatively coupling the first and second portable communication devices; and
wherein the first rotary control switch selectively controls a plurality of radio channels and the second rotary control switch is automatically remapped to selectively control a different set of channels.

4. A communication system, comprising:
a first portable communication device comprising a portable radio, the portable radio having a first rotary control switch comprising a radio channel control switch; and
a second portable communication device comprising a remote speaker microphone (RSM), the RSM having a second rotary control switch comprising a RSM channel control switch, the RSM being operatively coupled to the portable radio, and the RSM channel control switch extending selectivity of the radio channel control switch, wherein:
the radio channel control switch is automatically remapped as a zone control switch upon coupling of the portable radio and the RSM;
the RSM channel control switch controlling channel selection within a selected channel zone of the zone control switch; and
wherein the zone control switch controls channel zone selection over 16 zones, and the RSM control switch controls selection of 16 channels per zone for a total of 256 channels.

5. A communication system, comprising:
a first portable communication device having a first rotary control switch; and
a second portable communication device having a second rotary control switch, the second portable communication device being operatively coupled to the first portable communication device, and the second rotary control switch extending selectivity of the first rotary control switch, wherein:
the first portable communication device comprises a portable radio, and the second portable communication device comprises a remote speaker microphone (RSM);
the first rotary control switch comprises a radio channel control switch having a plurality of hardstops for predetermined radio channels;
the second rotary control switch comprises an RSM channel control switch having another plurality of hardstops duplicating the predetermined radio channels; and
at least one of the plurality of hardstops of the radio channel control switch being dedicated to automatically remap the RSM channel control switch to a different set of channels for extended channel selectivity.

6. A method for extending switch selectivity in a portable communication system, comprising:
- operatively coupling a first portable communication device to a second portable communication device, the first portable communication device having a first rotary control switch and the second portable communication device having a second rotary control switch;
- remapping one of the rotary control switches based on the presence of the other rotary control switch to extend switch selectivity;
- wherein the remapping occurs in response to the first rotary control switch being rotated to a predetermined hardstop position; and
- enabling extended switch selectivity at the second rotary control switch in response thereto.

7. The method of claim 6, wherein the extended switch selectivity comprises extended channel selectivity.

8. A method for extending switch selectivity in a portable communication system, comprising:
- operatively coupling a first portable communication device to a second portable communication device, the first portable communication device having a first rotary control switch and the second portable communication device having a second rotary control switch;
- remapping one of the rotary control switches based on the presence of the other rotary control switch to extend switch selectivity;
- wherein the remapping occurs in response to the second rotary control switch being rotated to a predetermined hardstop position; and
- enabling extended switch selectivity at the first rotary control switch in response thereto.

9. A method for extending channel selectivity in a portable communication system, comprising:
- operatively coupling a portable radio to a radio accessory device; and
- remapping a rotary control channel switch of the portable radio based on detecting the presence of another rotary control channel switch on the radio accessory device to extend channel switch selectivity of the portable communication system, wherein remapping occurs in response to detecting a hardstop of the rotary control channel switch on the radio accessory device.

10. A method for extending channel selectivity in a portable communication system, comprising:
- operatively coupling a portable radio to a radio accessory device; and
- remapping a rotary control channel switch of the portable radio based on detecting the presence of another rotary control channel switch on the radio accessory device to extend channel switch selectivity of the portable communication system; and
- wherein remapping automatically remaps the radio accessory device channel control switch to a different set of channels for extended channel selectivity.

* * * * *